Patented Jan. 16, 1945

2,367,508

UNITED STATES PATENT OFFICE 2,367,508

RETARDATION OF DIFFUSION OF SENSITIZING DYES

Edward B. Knott, Wealdstone, England, assignor to Eastman Kodak Company, Rochester, N. Y., a corporation of New Jersey No Drawing. Application January 23, 1943, Serial No. 473,390. In Great Britain April 21, 1942

4 Claims. (Cl. 95—7)

This invention relates to the retardation of diffusion of sensitizing dyes in photographic silver salt emulsions.

For certain purposes in photography sensitive papers, films, plates and similar materials are required, the sensitive element comprising a plurality of photographic emulsions, such as gelatino-silver-halide emulsions, mixed together and having different spectral sensitivities. Thus, in some cases, in color photography, two or more emulsions of different spectral sensitivities are mixed together in one layer. Again, multi-contrast printing papers which are capable of giving a result of high or low contrast, depending on the color of the light used in printing, can be produced by applying to a paper or other support a mixture of two emulsions, one of which gives an image of high contrast and can be printed by using light of one color, and the second of which gives an image of low contrast and can be printed by light of a different color.

The different spectral sensitivities of the emulsions is accomplished by employing sensitizing dyes. Thus when two emulsions are mixed, one of them may be prepared free from sensitizing dyes and hence sensitive to blue light but not to light of longer wavelengths at the ordinary exposure times, and the other emulsion may contain a dye which sensitizes the emulsion to yellow light, in which case the second emulsion is sensitive to both yellow and blue light. The emulsions will thus be sensitive to different ranges of the spectrum. Alternatively, the one emulsion may contain a dye which sensitizes it to one spectral region, and the second emulsion may contain a different dye which sensitizes it to another spectral region, so that the one emulsion is insensitive to light of a color to which the other emulsion is sensitive. Numerous sensitizing dyes which can be used are known.

In the production of photographic elements of these kinds, a serious difficulty arises, viz. a tendency for the sensitizing dye in the one emulsion to wander (or diffuse) to another emulsion in which its presence is not desired. If this occurs, the initial difference in color sensitivity between the emulsions is reduced, and may even be practically lost. There have been methods provided for retarding this diffusion of sensitizing dyes. First, a sensitizing dye of low inherent tendency to diffuse can be employed. Second, the diffusion can be retarded by incorporating in the emulsions certain substances, e. g. resins, resin salts and certain inorganic salts. Another method of retarding diffusion is to incorporate the sensitizing dyes in the emulsions during the preparation of the emulsions rather than to the finished emulsions. So incorporated the dyes appear to become more securely attached to the emulsion grains. Moreover, if the amount of sensitizing dye employed is greater than the saturation capacity of the emulsion grains, wandering will be more likely to occur.

I have now found that when a dye-sensitized emulsion is mixed with another emulsion which may or may not be dye-sensitized, there is a critical temperature above which the tendency for the sensitizing dyes to diffuse is greatly increased. In fact, at temperatures much above this critical limit, it is very difficult in some instances to prevent a very large amount of dye-wandering by any means, unless the dye is introduced during the preparation of the emulsion, a procedure which sometimes involves disadvantages, since the emulsion is then likely to lose contrast.

It is, accordingly, an object of my invention to provide a new process for retarding the diffusion of sensitizing dyes in photographic emulsions. A further object is to provide photographic emulsions in which diffusion of sensitizing dyes has been retarded. Other objects will become apparent hereinafter.

In accordance with the invention, two emulsions, at least one of which contains a sensitizing dye, are mixed together at a temperature not above the critical temperature above which diffusion of the sensitizing dye is greatly increased from the diffusion of the sensitizing dye obtaining at and below the critical temperature. Preferably the two emulsions are mixed together well below (e. g. 3 to 5 degrees below) the critical temperature. The conditions must be so controlled that the temperature of the liquid emulsions, after being brought into contact, does not exceed the critical temperature. Thus, after the emulsions are mixed, the liquid mixed emulsion must be coated at a temperature which does not exceed the critical temperature.

The critical temperature for any two emulsions depends upon the nature of the emulsions and must be determined beforehand for each pair of emulsions employed. The critical temperature is readily determined in cases where the two emulsions have widely different gamma (contrast) values by dye-sensitizing at least one of the emulsions so that the emulsions can be exposed to light of different wavelengths, determining, in the usual manner, the gamma values of the separate emulsions at the different wavelengths, and then mixing the liquid emulsions at a selected temperature, allowing the liquid mixed emulsion to stand for 30 minutes at the selected temperature, coating the liquid mixed emulsion at the selected temperature, and then determining the gamma values of the coated mixed emulsion at the two different wavelengths originally used. If the difference between the gamma values in the final determination is not substantially less than the difference in the first instance, diffusion has not occurred appreciably. If the difference is substantially less so that the desired difference is contrast is not maintained, considerable diffusion of the sensitizing dye has occurred, and the same procedure should be repeated using a lower temperature and so on until the maximum separation in contrast is attained in the mixed emulsion, i. e. until diffusion of the sensitizing dye is at a minimum. Instead of actually measuring the relative contrasts as set forth above, the relative contrasts can be estimated by merely visually inspecting the wedge-spectograms of the separate emulsions and the mixed emulsion exposed, as set forth above. Obviously such a method is less precise than one where the relative contrasts are actually measured from the characteristic curves of the emulsions.

Where the two emulsions do not have widely different contrasts, the critical temperature is best determined by actually preparing a sample of the desired photographic element involving the two emulsions mixed together, operating at a selected temperature as hereinbefore set forth, and testing the sample to determined whether the desired result has been obtained or if diffusion of the sensitizing dye has seriously impaired the desired result. Operation should then be effected at a lower temperature and so on until the optimum result is obtained, i. e. until the critical or lower temperature is reached.

It is to be appreciated that reasonably satisfactory results might well be obtained even if the temperature were allowed to exceed the critical temperature, but nevertheless if the temperature does not exceed this critical temperature, the wandering whatever it may be is greatly reduced, and it is with this improved result that the present invention is concerned.

By means of my new process, the prior above referred-to methods for retarding the diffusion of sensitizing dyes can be improved, and especially effective retardation can be obtained by complementing the prior processes with my new process. Thus, my new process can be applied to the emulsions containing water-insoluble resins, such as whole shellac or lac, hard shellac or lac, soft shellac or lac, hydrolyzed shellac or lac, colophony, glyptal resins, gum mastic, dammar, sandarach, copal, kauri and coumarone resins, described in the copending application of Edward P. Davey, Serial No. 387,437, filed April 8, 1941 (now United States Patent 2,331,660, patented October 12, 1943). See also British Patent 540,451, accepted October 17, 1941. My new process can be applied to the emulsions containing metal oxides, metal hydroxides, metal oxysalts, metal hydroxy salts, or resin salts, described in my copending application Serial No. 391,375. filed May 1, 1941. See also British Patents 540,464, accepted October 17, 1941, and 544,134, accepted March 30, 1942. My invention is especially useful in the manufacture of multi-contrast (variable contrast) printing materials, such as are described for example in British Patents 541,510, 541,511 and 541,514, accepted November 28, 1941.

In practicing my invention, the emulsions employed can be of the same or of different silver halides, and can be gelatino-silver-bromide, chloride, chlorobromide or iodobromide emulsions. In general, it has been found that where a dye-sensitized gelatino-silver-bromide, chloride, chlorobromide or iodobromide emulsion containing a dispersion of soft lac resin is mixed with a gelatino-silver-bromide or iodobromide emulsion also containing soft lac resin but not itself dye-sensitized, the critical temperature is about 33° C. and in this case the temperature is preferably not allowed to exceed about 30° C. Similarly, where any of the abovementioned dye-sensitized emulsions is mixed with a gelatino-silver-chloride or chlorobromide emulsion (containing soft lac resin) not itself dye-sensitized, the critical temperature is, in general, about 28° C., and in this instance the temperature is preferably not allowed to exceed about 25° C. A critical temperature of about 28° C. likewise applies when a dye-sensitized gelatino-silver-chloride emulsion (or chlorobromide emulsion or low bromide content) is mixed with a second dye-sensitized emulsion of the same kind (the emulsions contain sufficient lac resin as before), and here again the temperature is preferably not allowed to exceed about 25° C.

The following examples will serve to illustrate typical embodiments of my invention, these embodiments being especially useful in the manufacture of multi-contrast printing papers.

*Example I.*—To 800 cc. of a contrasty gelatino-silver-bromide emulsion containing the equivalent of 20 grams silver nitrate there was added a solution of 0.003 gram of [5-(1-phenyl-3-n-heptyl-2-thiohydantoin)]-[2-(3-ethylbenzoxazole)]-di-methinmerocyanine in 10 cc. of acetone. After standing for 15 minutes, 12 cc. of an 8 percent alcoholic solution of soft lac resin were added in a fine stream. The temperature was then adjusted to 30° C. and the emulsion was mixed with 800 cc. of a soft gelatino-silver-bromide emulsion containing the same quantity of silver and soft lac resin, also at 30° C. The mixture was then coated, the temperature of the liquid mixed emulsion not being allowed to exceed 30° C.

No apparent dye-wandering took place even if the mixed emulsion was kept for over an hour before coating.

*Example II.*—1,000 cc. of a contrasty gelantino-silver-chloride emulsion was sensitized with 0.004 gram of the dye defined in Example I, and a similar addition of resin solution was made. 1,000 cc. of a soft gelatino-silver-chloride emulsion was sensitized with 0.005 gram of [5-(3-n-heptylrhodanine)]-[2-(3-methyl-4:5-benzbenzoxazole)]-merocyanine, a similar addition of resin solution was made to this emulsion also, and the two emulsions were then mixed at 25° C. and coated without the temperature being allowed to exceed this value.

No apparent trace of dye-wandering occurred, even if the mixed emulsion was kept liquid for 30 minutes before coating.

*Example III.*—1,000 cc. of a contrasty gelatino-silver-chloride emulsion containing the equivalent of 20 grams of silver nitrate was sensitized with 0.01 gram of [5-(1-phenyl-3-ethyl-2-thiohydantoin)]-[2-(3-ethylbenzoxazole)]-dimethinomerocyanine, and 40 cc. of an 8 percent alcoholic solution of soft lac resin was added. The temperature was adjusted to 30° C., and the emulsion was mixed with 800 cc. of a soft gelatino-silver-iodobromide emulsion containing the same equivalent of silver and to which the same quantity of resin solution had been added, this emulsion also being at 30° C.

Provided the temperature of the mixed emulsion did not rise above 30° C., the mixed emulsion could be maintained in the liquid state for an hour before coating and still no apparent dye-wandering occurred.

Examples of other dyes which may be employed in the manner described for the dye in Example III are as follows. A suitable amount of dye to be employed in these instances is 0.005 gram instead of 0.01 gram.

[5(3-n-heptylrhodanine)] [2(3-ethyl benzoxazole)]-dimethinmerocyanine
(Figure 1 of British Specification No. 532,098)
[5(1-phenyl-3-n-heptyl-2-thiohydantoin)] [2(3-ethylbenzthiazole)]-dimethinmerocyanine
(Figure 7 of British Specification No. 532,098)
} These dyes showed no wandering at 30° C. and only slight wandering at 35° C.

1:1'-diethyl-2:2'-cyanine iodide
3:3' - diethyl - 4:5:4':5' - dibenzoxacarbocyanine iodide
[5(3 - ethylrhodanine)] [2(3 - ethylbenzoxazole)]-dimethinmerocyanine
(Example 6 of the complete specification of British Specification No. 450,958)
} These dyes showed only slight wandering at 30° C.

Further examples of dyes which may be employed in the manner described for the dye in Example I are as follows:

9-methyl-3:3'-diethyl-4:5:4':5'-dibenzthiacarbocyanine iodide
5:5' - dichloro - 3:3':9 - triethylthiacarbocyanine chloride
} These dyes showed only slight wandering at 30° C.

It should be noted that at the relatively low temperatures required according to the invention, there may be a tendency for the mixed emulsion to set or increase unduly in viscosity, and this is especially true if a temperature of as low as 25° C. is employed. If such a tendency is encountered, it may be desired to lower the setting point or setting rate of the emulsion. This may be done by various well-known means, such as by using emulsions of lower gelatin content, by using degraded gelatins, by adding urea to the emulsions, or by adding certain inorganic salts such as sodium nitrate, sodium chloride or sodium dihydrogen phosphate to the emulsions.

It will be appreciated that the diffusion of certain sensitizing dyes can be retarded by my new method much more effectively than is the case with certain other sensitizing dyes. By far, the best results can be obtained in accordance with my invention by employing dyes which are known to have some inherent resistance to diffusion. Such sensitizing dyes which sensitize to the green are to be found in the thia-2'-cyanine, the benzothia-2'-cyanine, the selena-2'-cyanine, the 2,2'-cyanine, the thiazolo-2'-cyanine and the dibenzoxacarbo cyanine classes of dyes. Such dyes which sensitize to longer wavelengths are to be found in the dibenzothiocarbo cyanine, the 5,5'-dichlorothiacarbo cyanine, the 5-chlorothiacarbo cyanine, the 5-chlorothiabenzothiacarbo cyanine, the 5,5'-dichloroselenacarbo cyanine, the 5-chloroselenacarbo cyanine and the 5-chloroselenabenzothiacarbo cyanine class of dyes. (In referring to the names of the above carbo cyanine dyes, the benzothiazole and benzoselenazole nuclei are numbered in accordance with the system adopted by Chemical Abstracts with the sulfur or selenium atom the number one atom.) Such sensitizing dyes having some inherent resistance to diffusion are also to be found among the simple merocyanines, the merocarbo cyanines and the merodicarbo cyanines, containing on the one hand a 3-alkyl rhodanine, a 3-aryl rhodanine or a 2-diaryl-amino-4(5)-thiazolone nucleus and on the other hand, a benzoxazole, a benzothiazole, a benzoselenazole, a naphthothiazole, or a simple thiazole nucleus, (i. e. thiazole nucleus devoid of a fused-one aromatic ring, e. g. 4-methyl thiazole and 4-phenyl thiazole). Merocyanine dyes which contain a long-chain organic group (e. g. a 3-peptyl-1-phenyl-2-thiohydantoin nucleus) possess good resistance to diffusion and are described in U. S. Patent 2,282,116, dated May 6, 1942.

What I claim as my invention and desire to be secured by Letters Patent of the United States is:

1. A process for retarding diffusion of a sensitizing dye from a photographic emulsion selected from the group consisting of photographic gelatino-silver-chloride emulsions and photographic gelatino-silver-chlorobromide emulsions of low bromide content, said emulsion being sensitized with a sensitizing dye and having a viscosity low enough that the emulsion can be coated on a support at 25° C., to a second photographic emulsion selected from the group consisting of photographic gelatino-silver-chloride emulsions and gelatino-silver-chlorobromide emulsions of low bromide content, said second emulsion having a contrast different from that of the first emulsion and having a viscosity low enough that the emulsion can be coated on a support at 25° C. comprising mixing the two emulsions at a temperature of from 25 to 28° C. and coating the mixed emulsions on a support at a temperature of from 25° to 28° C.

2. A process for retarding diffusion of a sensitizing dye from a photographic emulsion selected from the group consisting of photographic gelatino-silver-chloride emulsions and photographic gelatino-silver-chlorobromide emulsions of low bromide content, said emulsion being sensitized with a sensitizing dye and having a viscosity low enough that the emulsion can be coated on a support at 25° C., to a second photographic emulsion selected from the group consisting of photographic gelatino-silver-chloride emulsions and gelatino-silver-chlorobromide emulsions of low bromide content, said second emulsion having a contrast different from that of the first emulsion and having a viscosity low enough that the emulsion can be coated on a support at 25° C., comprising mixing the two emulsions at a temperature of 25° C. and coating the mixed emulsions on a support at a temperature of 25° C.

3. A process for retarding diffusion of sensitizing dyes from a photographic emulsion selected from the group consisting of photographic gelatino-silver-chloride emulsions and photographic gelatino-silver-chlorobromide emulsions of low bromide content, said emulsion containing a sensitizing dye and a soft lac resin and having a viscosity low enough that the emulsion can be coated on a support at 25° C., to a second photographic emulsion selected from the group consisting of photographic gelatino-silver-chloride emulsions and photographic silver-chlorobromide emulsions of low bromide content and having a contrast different from that of the first emulsion and containing a soft lac resin and having a viscosity low enough that the emulsion can be coated on a support at 25° C., comprising mixing the two emulsions at a temperature of from 25° to 28° C. and coating the mixed emulsions on a support at a temperature of from 25° to 28° C.

4. A process for retarding diffusion of sensitizing dyes from a photographic emulsion selected from the group consisting of photographic gelatino-silver-chloride emulsions and photographic gelatino-silver-chlorobromide emulsions of low bromide content, said emulsion containing a sensitizing dye and a soft lac resin and having a viscosity low enough that the emulsion can be coated on a support at 25° C., to a second photographic emulsion selected from the group consisting of photographic gelatino-silver-chloride emulsions and photographic silver-chlorobromide emulsions of low bromide content and having a contrast different from that of the first emulsion and containing a soft lac resin and having a viscosity low enough that the emulsion can be coated on a support at 25° C., comprising mixing the two emulsions at a temperature of 25° C. and coating the mixed emulsions on a support at a temperature of 25° C.

EDWARD B. KNOTT.